United States Patent
Chun (10) Patent No.: US 10,708,069 B2
(45) Date of Patent: Jul. 7, 2020

(54) IOT-BASED THINGS MANAGEMENT SYSTEM AND METHOD USING BLOCK-CHAIN AUTHENTICATION

(71) Applicant: Sam Gu Chun, Seoul (KR)

(72) Inventor: Sam Gu Chun, Seoul (KR)

( * ) Notice: Subject to any disclaimer, the term of this patent is extended or adjusted under 35 U.S.C. 154(b) by 0 days.

(21) Appl. No.: 15/559,782

(22) PCT Filed: Nov. 8, 2016

(86) PCT No.: PCT/KR2016/012768
§ 371 (c)(1),
(2) Date: Sep. 19, 2017

(87) PCT Pub. No.: WO2017/095036
PCT Pub. Date: Jun. 8, 2017

(65) Prior Publication Data
US 2018/0254905 A1    Sep. 6, 2018

(30) Foreign Application Priority Data

Nov. 30, 2015  (KR) ........................ 10-2015-0168483

(51) Int. Cl.
*H04L 29/06* (2006.01)
*H04L 9/32* (2006.01)
(Continued)

(52) U.S. Cl.
CPC ............ *H04L 9/3265* (2013.01); *H04L 9/083* (2013.01); *H04L 9/30* (2013.01); *H04L 9/3236* (2013.01);
(Continued)

(58) Field of Classification Search
CPC ..... H04L 63/062; H04L 9/083; H04L 9/3236; H04L 9/3265
See application file for complete search history.

(56) References Cited

U.S. PATENT DOCUMENTS 9,397,985 B1 * 7/2016 Seger, II ............ H04L 63/0442
9,686,362 B2   6/2017 Choi et al.
(Continued)

FOREIGN PATENT DOCUMENTS

KR    20130019358 A    2/2013
KR    20140121533 A   10/2014
(Continued)

OTHER PUBLICATIONS

Zhang, Yu; Wen, Jiangtao; "An IoT Electric Business Model Based on the Protocol of Bitcoin", 18th International Conference on Intelligence in Next Generation Networks, IEEE, Feb. 17-19, 2015, pp. 184-191.*

(Continued)

*Primary Examiner* — Victor Lesniewski
(74) *Attorney, Agent, or Firm* — RatnerPrestia (57) ABSTRACT

An Internet of Things (IoT)-based thing management system using block chain authentication, where unit nodes connect to each other through a network, things connect to each other in each of the unit nodes, and control instructions for causing the things to operate are mutually authenticated by the unit nodes. Each of the things performing individual functions separately, and a core which includes n block chain having n blocks recording operation histories of the things thereon. The core generating public and private keys based on the n block chain and providing the keys to each of the things, wherein one of the things includes a controller which has a list of public keys provided by the core. The controller sends a control instruction so as to control operations of the thing. The thing sends the controller a response signal and performs an operation according to the control instruction.

13 Claims, 4 Drawing Sheets

(51) Int. Cl.
*H04W 12/06* (2009.01)
*H04W 4/70* (2018.01)
*H04L 9/08* (2006.01)
*H04L 9/30* (2006.01)
*H04L 29/08* (2006.01)

(52) U.S. Cl.
CPC .......... *H04L 9/3273* (2013.01); *H04L 63/062* (2013.01); *H04W 4/70* (2018.02); *H04W 12/06* (2013.01); *H04L 67/12* (2013.01); *H04L 2209/38* (2013.01); *H04L 2209/80* (2013.01)

(56) References Cited

U.S. PATENT DOCUMENTS

| | | | |
|---|---|---|---|
| 9,967,333 B2* | 5/2018 | Chen | H04L 67/104 |
| 10,420,151 B2* | 9/2019 | Zakaria | H04W 76/14 |
| 2014/0244001 A1 | 8/2014 | Glickfield et al. | |
| 2014/0310515 A1 | 10/2014 | Kim et al. | |
| 2015/0071139 A1* | 3/2015 | Nix | H04W 4/70 370/311 |
| 2015/0229654 A1* | 8/2015 | Perier | H04W 12/06 726/3 |
| 2015/0379510 A1* | 12/2015 | Smith | G06Q 20/3829 705/71 |
| 2016/0006723 A1* | 1/2016 | Wilson | G06F 21/34 713/175 |
| 2016/0012424 A1* | 1/2016 | Simon | G06Q 20/3674 705/67 |
| 2016/0080380 A1* | 3/2016 | Dawoud Shenouda Dawoud | H04L 63/0876 713/156 |
| 2016/0127019 A1* | 5/2016 | Schelstraete | H04B 7/0626 370/252 |
| 2016/0224977 A1* | 8/2016 | Sabba | G06Q 20/385 |
| 2016/0285628 A1* | 9/2016 | Carrer | H04L 9/3228 |
| 2017/0046664 A1* | 2/2017 | Haldenby | G06Q 20/0655 |
| 2017/0055148 A1* | 2/2017 | Zimmerman | H04W 4/70 |
| 2017/0134280 A1* | 5/2017 | Davis | G06Q 20/10 |

FOREIGN PATENT DOCUMENTS

| | | |
|---|---|---|
| KR | 20150082743 A | 7/2015 |
| KR | 101560200 B1 | 10/2015 |
| KR | 20150123850 A | 11/2015 |

OTHER PUBLICATIONS

Kishigami, Jay; Fujimura, Shigeru; Watanabe, Hiroki; Nakadaira, Atsushi; Akutsu, Akihiko; "The Blockchain-based Digital Content Distribution System", Fifth International Conference on Big Data and Cloud Computing, IEEE, Aug. 26-28, 2015, pp. 187-190.*

International Search Report and Written Opinion for International Aplication No. PCT/KR2016/012768, dated Feb. 22, 2017—6 Pages.

Chun, "Blockchain Technology & Strategy Using Fintech and IoT," IoT Convergence In-Depth Conference 2015, 18 pages.

* cited by examiner

IOT-BASED THINGS MANAGEMENT SYSTEM AND METHOD USING BLOCK-CHAIN AUTHENTICATION

CROSS-REFERENCE TO RELATED APPLICATIONS

This application is the U.S. national phase application of PCT International Application No. PCT/KR2016/012768 filed Nov. 8, 2016, which claims priority to Republic of Korea Patent Application No. KR 10-2015-0168483 filed Nov. 30, 2015, the contents of each application being incorporated by reference herein.

FIELD OF THE INVENTION

The present invention relates to an Internet of Things (IoT)-based thing management system and an IoT-based thing management method, using block chain authentication, and, more particularly, to an IoT-based thing management system and an IoT-based thing management method in which the authentication technique of bitcoin block chain is deformed and applied to the IoT-based things management system so as to be adaptively used in a home IoT management system, a building IoT management system, a farm IoT management system, a field and/or mountain IoT management system and the like.

BACKGROUND OF THE INVENTION

As the IoT field spreads to enlarged application areas, the communication security between each thing, or between each IoT-related machine poses an important challenge or major problem. In the communication between IoT-related machines, the mutual authentication for allowing the machines to identify each other mainly features the radio frequency encryption sink/control technique and the Bluetooth technique. Because both techniques use their specific radio frequency bands, there are some problems in the techniques as follows:

In cases where not only in the IoT field and the mutual authentication field but also in thing-to-thing (machine-to-machine) communication fields and the like, during or after specifying and identifying machines, devices or users, it is required to maintain the security of the communication between them in any one of wire communication lines and wireless communication lines, or wire communication network or wireless communication network. Generally, however, it is difficult to fundamentally avoid occasional occurrences of hacking or breakaway of authority in those cases.

In a case where a specific frequency band is used in a communication technique, a machine-to-machine communication may occur in the specific frequency band which is temporally allocated or corresponds to a frequency continuously allocated to the related machines itself such that encrypted or decrypted control data of the communication may be used according to machine-to-machine characteristics. As a result, such a process may cause a minor time lag (time loss) in control speed to lead to some malfunction, which may occur more easily in the communication as the distance between reception and transmission of the communication increases longer.

Further, because frequency bands are used in a communication, it is basically possible to make hacking through the used frequency. Specifically, in a case where a person having bad intention or a bad person interferes and catches the used specific frequency via another machine, it is difficult to prevent the bad person from gaining the control of the communication. Even though a person has no bad intention, it is also difficult to completely prevent the no-bad person from unintentionally interfering of the frequency which resultantly may cause the malfunction in the communication.

Furthermore, in the case of wireless communication technique using the Bluetooth, there are some problems as follows: First, the IoT-based mutual authentication of the Bluetooth paring has a problem similar to that of the authentication for the wireless channel technique mentioned above. Particularly, the Bluetooth signal has relatively very shorter distance between reception and transmission as compared to the other wireless communication, and has a strong straightness, and thus, it is difficult to make mutual identifying between communication entities in a case where the communication distance between the entities is more than 10 m, or in a case where the entities are in a wide space. Although up-to-date technique of the Bluetooth has been highly improved as compared to Bluetooth version 2.0, still mutual interferences tend to easily occurs under the Bluetooth environment, in a case where a plurality of machines are located in the same space. Second, it is generally known that the Bluetooth has relatively lower interference and higher security as compared to the known technique using the radio frequency bands. In fact, however, in contrast to what is known so far, the Bluetooth also has a problem similar to that of the technique using the radio frequency bands. Particularly, in a case where an electrical short occurs in a Bluetooth machine, an access authority often appears to be easily intercepted by a hacking. Also, under the Bluetooth technique, it is easily found that the pairing code itself can be remotely handled by a strange or bad party which gains the authority as a result. Accordingly, in some aspects, the Bluetooth-related technique may be further inferior to the technique using radio frequency bands in the security performance. Third, the mutual authentication of the Bluetooth-related technique has an advantage in that relatively larger amount of data can be rapidly transmitted under the Bluetooth environment as compared to the technique using radio frequency bands. Therefore, the Bluetooth is used mainly in acoustic machines of small type, or the mutual authentication or mutual identification between digital equipments. However, the conventional electronic authentication or conventional electronic security technique uses a centralized security system based on a maximum 256 byte reference such that the conventional technique is vulnerable to a hacking, and thus causes operating and managing of the system for defending any possible hacking to cost too much. In order to overcome the problems of the conventional authentication systems mentioned above, further improved electronic authentication and security solution is urgently needed, especially, in the next generation banking industry in which the financial (fin)-tech field is mainly focused.

Meanwhile, in the field of Lower Power Wide Area Network (LPWAN) which may be used in the IoT-based thing-to-thing communication, ISM (Industrial, Scientific, Medical) frequency of License-Free Frequency Band is usually used to reduce communication cost. However, this LPWAN using the ISM also has the problem of security weakness, and thus, it is difficult to increase or widen applications of the LPWAN to other areas.

Further, the conventional IoT or M2M (Machine to Machine) communication management system is operated mainly by a central server. Therefore, the management cost of the central sever becomes generally high to resultantly burden users with big costs. Also, the central server is easily exposed to external bad parties, and thus, the central server is potentially a target of hackers such that danger of hacking may continue and the cost for the prevention of hacking may increase high to greatly burden possible users or possible service providers.

SUMMARY OF THE INVENTION

Technical Problem

The present invention is intended to solve the problems of the prior arts described above, and one of the objects is to provide an IoT-based thing management system and an IoT-based thing management method using block chain authentication wherein it is possible to fundamentally solve the problems such as communication security weakness and hacking in wire or wireless communication systems between things or machines, to reduce the possibility of communication failures generated during communications between things or machines, and to extend the system and the method of the present invention to various application areas.

Technical Solution

One aspect of the present invention may be embodied in an IoT-based thing management system using block chain authentication wherein a plurality of unit nodes connect to each other through at least one of wire communication network and wireless communication network, things connect to each other in each of the unit nodes, and control instructions for causing the things to be operated are mutually authenticated by the plurality of unit nodes so as to confirm the validity of the instructions; wherein each of the unit nodes comprises: a plurality of things which connect directly or indirectly to at least one of the wire communication network or the wireless communication network, each of the things performing individual functions separately; and a core which includes n block chain having n blocks (n is a natural number) recording operation histories of the things thereon, the blocks being linked one after another in the form of a chain, and the core generating unique public keys and unique private keys based on the n block chain and providing the generated keys to each of the things, wherein one of the plurality of the things includes a controller which has a list of public keys provided by the core, each of the public keys is unique to each of the things, the controller sends a control instruction with the controller's private key combined thereto, to a thing of which a public key is selected by the controller from the list of the public keys, so as to control operations of the thing based on the sent control instruction, and the thing sends the controller a response signal with the thing's private key combined thereto in response to the control instruction and performs an operation according to the control instruction; and wherein at least one of the control instruction with the controller's private key combined and the response signal with the thing's private key combined includes an n+1-th block which has a block hash including an encrypted hash of the effective n-th block, the n+1-th block is spread to the nodes, and the n-th block hash is previously approved and confirmed by the plurality of nodes.

Preferably, the controller may include a mobile terminal, a computer, or an independent module having a microprocessor, a memory and a control program installed therein, and the core may be disposed in a node, or disposed in a controller, a mobile terminal, or a computer such that the core can be connected to other cores through the wire communication network or the wireless communication networks by using a part of resources of the controller, the mobile terminal or the computer.

Preferably, at least a part of the nodes may send, to other nodes, an approval confirmation signal for approving an n+1-th block corresponding to the spread block hash, and the approval confirmation signal may be generated by each node on the basis of the n block chain that each node has, and, in the things, the public keys and the private keys may be automatically and periodically renewed.

Preferably, in a case where the number of the approval confirmation signals provided the nodes reaches a predetermined times, the n+1-th block corresponding to the block hash may be linked and recorded to the n block chain to resultantly generate an n+1 block chain such that the generated n+1 block chain is spread to all of the nodes and the n block chain is renewed to be changed into the n+1 block chain.

Preferably, at least one of the control instructions and the response signals may include an issuing time, and the generation of the block hash is performed by a controller or a thing.

Preferably, the wire communication network may include internets and the wireless communication network includes at least one of mobile networks and Low Power Wide Area Network (LPWAN).

Preferably, the node may include a thing system in a home or a reception center, and the thing system may be capable of figuring out states of the elderly and infirm or a handicapped person on the basis of operation history patterns of each thing in the home or the reception center.

Preferably, the node may include one of thing systems in homes, buildings, farms, factories, distribution fields, roads or a field and mountain, and at least one of the nodes includes a drone, a car or a smart palm as a thing.

Another one aspect of the present invention may be embodied in an IoT-based thing management method using an IoT-based thing management system using block chain authentication wherein a plurality of unit nodes connect to each other through at least one of wire communication network and wireless communication network, things connect to each other in each of the unit nodes, and control instructions for causing the things to be operated are mutually authenticated by the plurality of unit nodes so as to confirm the validity of the instructions, wherein the IoT-based thing management system comprises: a plurality of things which connect directly or indirectly to at least one of the wire communication network or the wireless communication network, each of the things performing individual functions separately; a core which includes n block chain having n blocks (n is a natural number) recording operation histories of the things thereon, the blocks being linked one after another in the form of a chain, and the core generating unique public keys and unique private keys based on the n block chain and providing the generated keys to each of the things; and a controller which controls operations of the plurality of the things, wherein the method comprises: generating, by the core, unique public keys and private keys based on an n block chain, allocating the generated keys to the things and the controller individually and providing a list of the public keys and corresponding private keys to the things and the controller; combining, by the controller, a control instruction with the controller's private key and the public key of a first thing as a control target and providing the resultant control instruction to the first thing; confirming, by the first thing, validity of the control instruction using the private key of the first thing, and sending the controller a response signal with the first thing's private key combined thereto in response to the control instruction and performing an operation according to the control instruction; generating a block hash corresponding to a n+1-th block based on at least one of the control signal and the response signal and spreading the generated block hash to all of the nodes; approving, by each node, the spread block hash; recording the n+1-th block into the n block chain, if number of the approval of the nodes reaches a predetermined level, to generate an n+1 block chain and spread the generated n+1 block chain to all of the nodes.

Preferably, the controller may include a mobile terminal, a computer, or an independent module having a microprocessor, a memory and a control program installed therein; and the core may be disposed in a node, or disposed in a controller, a mobile terminal, or a computer such that the core can be connected to other cores through the wire communication network or the wireless communication network by using a part of resources of the controller, the mobile terminal or the computer.

Preferably, at least one of the control signals and the response signals may include an issuing time, and the generation of the block hash is performed by a controller or a thing.

Preferably, the wire communication network may include internets and the wireless communication network includes at least one of mobile networks and Low Power Wide Area Network (LPWAN).

Preferably, the node may include a thing system in a home or a reception center, and the thing system is capable of figuring out states of the elderly and infirm or a handicapped person on the basis of operation history patterns of each thing in the home or the reception center.

Preferably, the node may include one of thing systems in homes, buildings, farms, factories, distribution fields, roads or a field and mountain, and at least one of the nodes includes a drone, a car or a smart palm as a thing.

Advantageous Effects

First, one of the best features of the block chain mutual authentication technique is in that previously generated and recorded block chain address cannot be forged. More specifically, in a case where block chain addresses are used to perform mutual authentications between a machine and a user or between machines, the related addresses may be allowed to be inquired by outside intruders, but the related addresses cannot be allowed to be forged and any authority for gaining the related addresses cannot be obtained as long as the outside intruder does not have the addresses which are previously and mutually authenticated using block chain mutual authentication technique. In this way, the present invention uses a new block chain authentication technique in which the block chain authentication technique is modified to be adaptively applied to the communication between things or machines, and thus, a specific thing or a specific thing management system cannot be allowed to be controlled by anyone except for a controller that is authenticated to the specific thing or the specific thing management system. Therefore, it is possible to fundamentally solve the problem of the big security burden against a bad intruder and the problem of the big cost for the security burden.

Second, the security system for the thing management system can be realized with lower cost, and thus, the thing management system having the security system can be widely applied to not only homes, farms, factories, banking field and companies, but also, other systems which requires further strong security means, that is, for example, government official systems, military-related systems in a field warfare area or in a military equipment area, and the like.

Third, the IoT thing management system and the IoT thing management method are basically based on a premise that the distributed management system is applied thereto, and thus, the systems and the methods do not essentially require a centralized server which is subjected to a big load for intensively managing a totally-focused system. Accordingly, in the IoT thing management system or the IoT thing management method of the present invention, the cost for preparing and managing such a centralized server is relatively lower, the centralized server itself may not be essentially required which would be otherwise a target of hacking, and thus, a burden for preventing hacking can be removed. Even if a special server for totally updating the system or effectively managing a part of functions of the distributed system is needed, processing which may be subjected to especially big load can be basically performed by the distributed system. Therefore, the possible special server has small functions and costs lower in management thereof, and even if a hacking attack takes place in the system, the distributed system does not suffer from big damages unlike general centralized servers of prior arts.

Fourth, a communication in the system is performed using the coupling technique between a public key and a private key, which is applied to the block chain system, and thus, the coupling between information transmitter and receiver can be certainly assured. Further, because normalization of communication can be certainly restored even from the occurrence of communication interruption, it is possible to reduce possibility of communication failure and to totally construct a confidential thing communication system.

The above-mentioned effect of the invention and other effects or advantages may be further clearly understood from the following embodiments described with the accompanying drawings which include the following figures:

BRIEF DESCRIPTION OF THE DRAWINGS

The invention is best understood from the following detailed description when read in connection with the accompanying drawings. Included in the drawings are the following figures.

DETAILED DESCRIPTION OF THE PREFERRED EMBODIMENTS

Hereinafter, preferable embodiments according to aspects of the present invention will be described with accompanying drawings.

Figure 1:
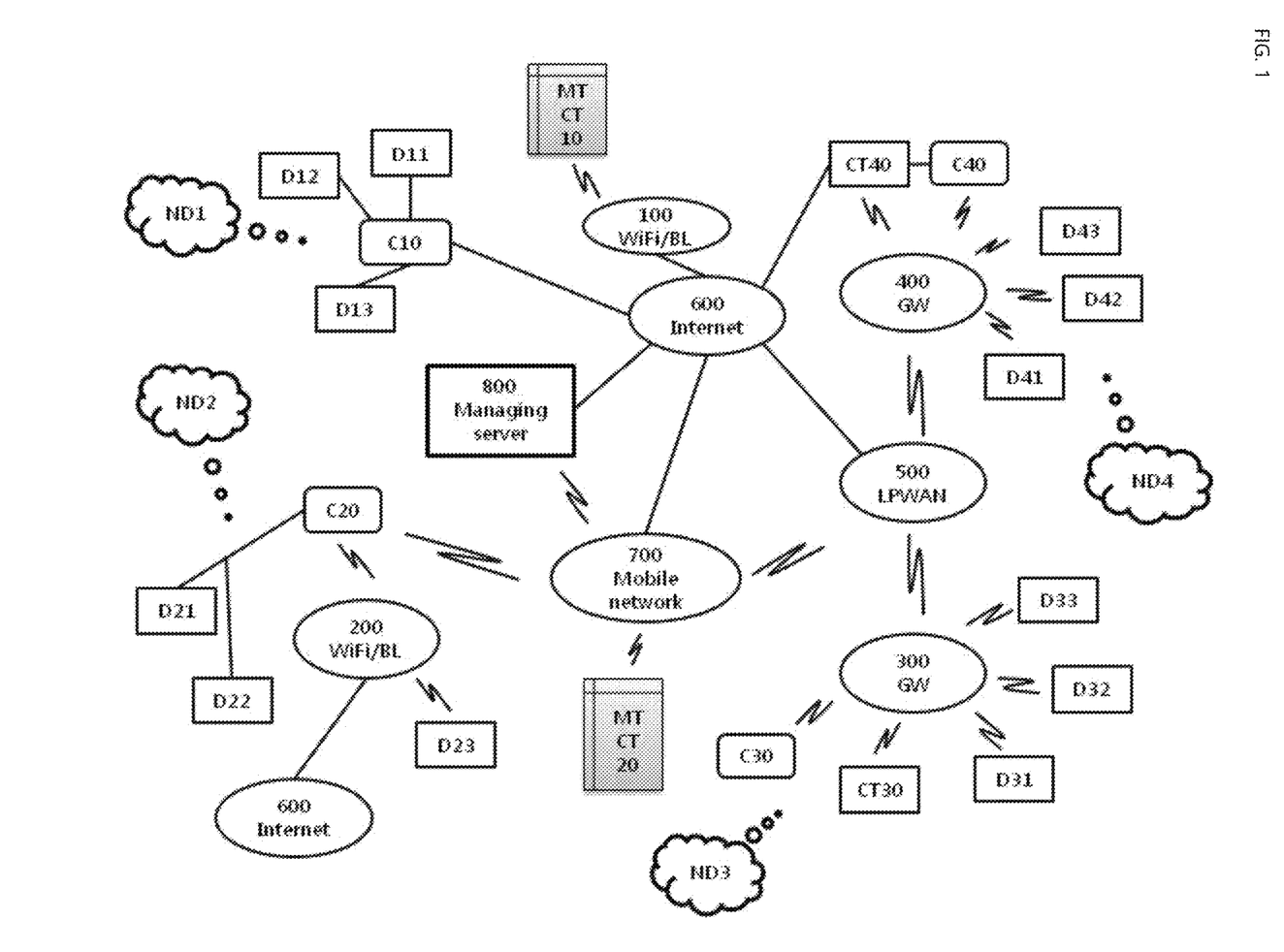
FIG. 1 is a schematic view of a total structure of an IoT-based thing management system using block chain authentication, according to an embodiment of the present invention.

FIG. 1 is a schematic view of a total structure of an IoT-based thing management system using block chain authentication, according to an embodiment of the present invention. According to an embodiment of the present invention, the IoT-based thing management system using block chain authentication (hereinafter referred to as "thing management system") is adapted to include a plurality of unit nodes ND1, ND2, ND3 and ND4 which are connected with each other through an Internet 600, a mobile network 700, a Low Power Wide Area Network (hereinafter referred to as "LPWAN") 500, a gateway (GW) 300 and 400 which may be included in or connect to the LPWAN 500, and the like. If necessary, the thing management system may further include a managing server 800 which may performs update, collection of data, or minimum-required management job. However, even without the managing server 800, the total thing management system can be adapted to be operated among or with the nodes ND1, ND2, ND3 and ND4. The total number of the unit nodes (hereinafter referred to as one of "unit node" or simply "node") is showed to be four for convenience of the explanation, but in practice there may be countless nodes in the system and the number of nodes is not limited to a specific number.

The nodes ND1, ND2, ND3 and ND4 may be different from each other in scales of involved constitutional elements or connections between the elements in the system. However, each node basically may be adapted to include a core C10, C20, C30 or C40 which has block chains, generates and provides unique public keys and unique private keys based on the previously existing block chains in the system; things D which are connected around the cores C10, C20, C30 or C40; and a controller CT10, CT20, CT30 or CT40 which provides control instructions such as an operation start, an operation stop, an operation time, an operation pattern and the like.

Referring to FIG. 1, a node ND1 (also, which may be referred to as "the first node", and the other nodes will be referred to as in the similar way, hereinafter) is adapted to include a core C10 (also, which may be referred to as "the first core", and the other cores will be referred to as in the similar way, hereinafter) around which three things D11, D12 and D13 (also which may be referred to as "the first thing, the second thing, and the third thing", and the other things will be referred to as in the similar way, hereinafter) are located and connect to the core C10 through wire lines. Also, the node ND1 is adapted to include a controller CT10 (also which may be referred to as "the first controller", and the other controllers will be referred to as in the similar way, hereinafter) which may be a mobile terminal MT connected to the core C10 via a WiFi/BL (Bluetooth) Network 100 and an internet 600. Herein, a used terminology, mobile terminal (MT or MTCT10) may correspond to, all kinds of communication means such as, so called, "smart-phone", I-phone" and the like, which can be portable and capable of performing data communication. Accordingly, for example, in the case of the first node ND1, the mobile terminal MD can remotely control operation of target things D11, D12 and D13 from a remote site as long as the mobile terminal MD can reach the internet 600 via a wireless communication. The first node ND1 may be used, for good example, in thing management systems in environments such as a home or a building in which an internet is usually set up around and the involved things (or machines) can be easily connected to each other via wire lines. Herein, in the case of the home, the things D11, D12 and D13 may correspond to, for example, an on-off valve of a gas supplying equipment, an electric heater, heating and cooling units, electric lamps, door locks, general home appliances or the like. Further, in the case of the building, the things may include, for example, general office equipments instead of home appliances.

The second node ND2 is adapted to include a core C20 around which two things D21 and D22 are located and connect to the core C20 through wire lines and another thing D23 connects to the core 20 via a wireless communication such as a WiFi/Bluetooth network 200. Also, the node ND2 is adapted to include a controller CT20 which may be a mobile terminal MT connected to the core C20 via a wireless communication such as a mobile network 700. The second node ND2 may be also applied to a general home or a general building in which a thing D23 may be connected via a short-range wireless network such as a WiFi/Bluetooth network 200. Accordingly, the case of node ND2 may be applied to, for example, laptop computers, office equipments of wireless control type and the like which may be used in order to avoid inconvenience or cumbersome of wire lines. Further, the second node ND2 may be properly applied to an environment in which the controller CT20 cannot reach any internet via any means.

The third node ND3 is adapted to include a core C30, a controller CT30 and things D31, D32 and D33 which are all connected to each other via wireless lines such as, so called, an LPWAN (Low Power Wide Area Network) 500 and a gateway 300 extended from the LPWAN 500. The LPWAN 500 may be very useful such that under the LPWAN, a short-range wireless communication distance of maximum 2 Km can be provided in a downtown area, and another short-range wireless communication distance of more than 100 Km provided in a field and mountain area or a farm area. Particularly, under the LPWAN 500, License-Free Frequency Band, that is, ISM (Industrial, Scientific, Medical) bands can be used, and thus, possible communication fees may be reduced. Further, under the LPWAN 500, Intrusion ability of radio wave is excellent and low power communication is available, and thus, in a farm area or a field and mountain area, even though sensors may be used for a long term (for example, one to five years), there is nothing to worry about drains of batteries mounted in the sensor modules. Accordingly, the LPWAN may be used in communications between one big building and another big building, or used in collecting an environment-related information data in a long-distance communication environment such as fields and mountains, and thus, the third node may be usefully applied to a farm area, small, middle or large scale factories, a large research complex, military equipments and the like. Furthermore, it is possible to perform a reliable wireless communication among the core 30, the controller CT300, and things D31, 32 and D33 which are all using the block chain authentication, and thus, the third node has no limitation in configurations, locations, kinds of things and the like so that the third node may be applicable to very wide areas. Concretely, the LPWAN 500 may include, for example, LoRaWAN™ in USA, Sigfor™ in European, Weightless™ of an open network style, the next generation technology LTE network and the like.

Basically, the fourth node ND4 has a structure similar to the third node ND3. However, the fourth ND4 is different from the third node ND3 in that in the fourth node, a controller CT40 such as a computer or a PC (Personal Computer) and the like connects directly to the internet 600, and a core C40 connects to, or is integrally formed with, the controller CT40. The fourth node ND4 may be properly applied to environments in which the controller CT40 requires relatively bigger load, a controlling entity (or a user) is located in a room, and things D41, D42 and D43 are widely distributed through a field or a wide area. For example, the fourth node ND4 may be properly operated in a military environment, a large scale factory, a reception center and the like. In the case of the military environment, things D41, D42 and D43 may be located in a warfare field and a controlling headquarter may be located within a room in a barracks.

The first to fourth nodes include exemplary specific numbers of cores, controllers and things for convenience's sake in the explanation, but the numbers is not limited thereto. For example, in the case of a wider environment, two cores and a plurality of controller may be used.

Hereinafter, a block chain authentication structure applied to the present invention will be described.

Figure 2:
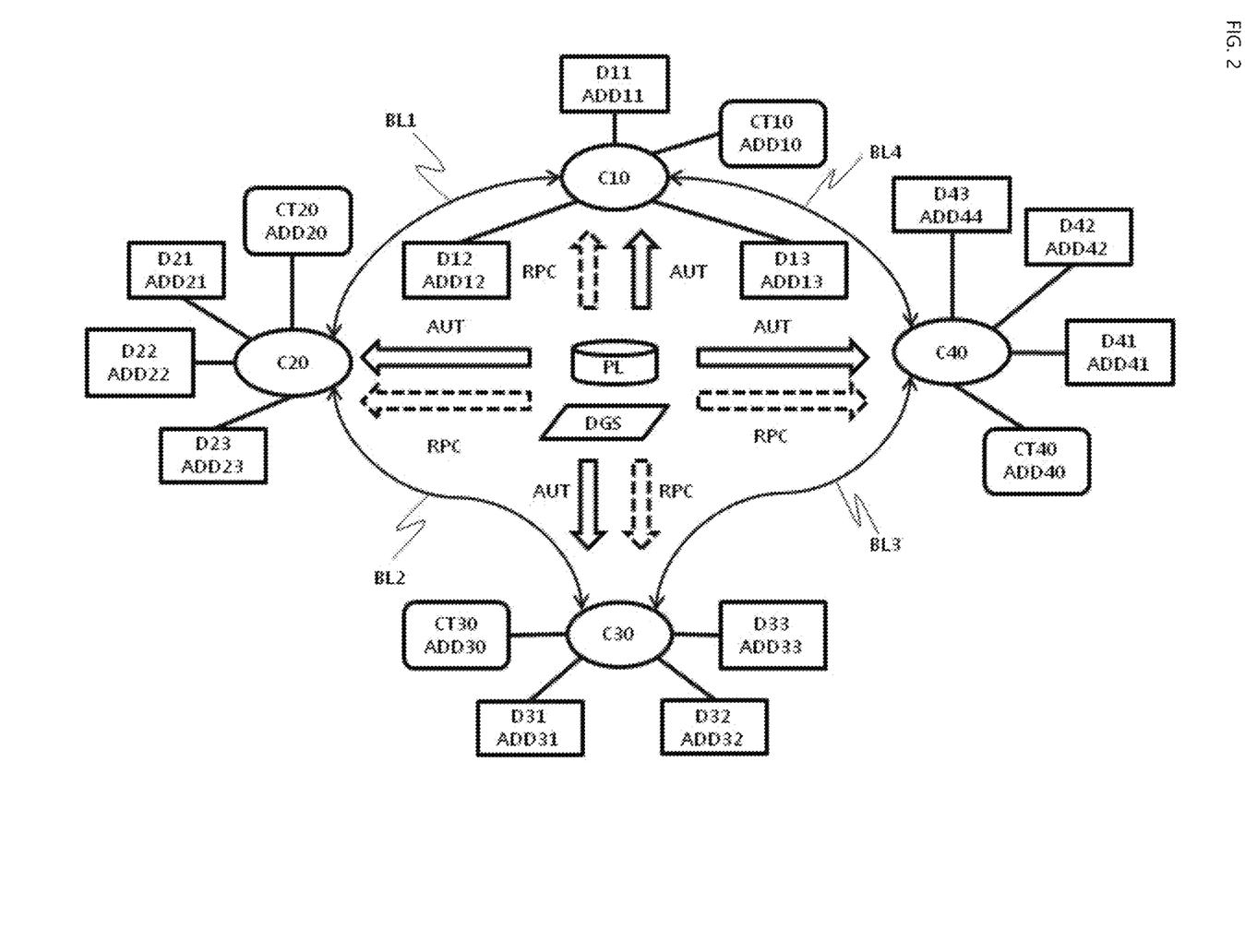
FIG. 2 is a schematic view of a process of the block chain authentication, according to an embodiment of the present invention.

FIG. 2 is a schematic view of a process of the block chain authentication, according to an embodiment of the present invention. The process of the block chain authentication will be described, mainly based on the first core C10.

(1) Using each of existing block chains (a chain having n (a natural number) blocks coupled thereto, hereinafter referred to as "n block chain"), the first core C10 generates and provides a public key and a private key to the controller CT10, the first thing D11, the second thing D12 and the third thing D13 which are all connected to the first core C10. The generated public keys and private keys may be substantially stored in a storage (corresponding to, for example, a memory in a microprocessor of chips or MPU type, see the controller and thing D in FIG. 3) mounted in each of the controller and the things in a nonvolatile pattern. Alternatively, the public keys and private keys may be adapted to be periodically generated or renewed in the storage.

For example, the first core C10 may generate a public key and a private key corresponding thereto as follows:

Generating a new public key
bitcoin-cli getnewaddress
1K3QKCeb9ZGzSpwhgymwu9SCTCGtgd4M1d (the generated public key)

With the generated public key used, generating a private key which is paired to the public key
bitcoin-cli dumpprivkey
"1K3QKCeb9ZGzSpwhgymwu9SCTCGtgd4M1d"
L2rDvL6WcXQbNi346yyHZm3D7tepE1ioCnL4wy9 CPPWQ4qPDY54P (the generated private key)

(2) The controller CT10 has an app functioning as a wallet therein. The installed app has public keys of each of things D11, D12 and D13.

The controller CT10 sends, for example, to the first thing D11, a control instruction for a specific operation with a public key of the first thing D11.

(3) The first thing D11 compares the received public key with the private key of the first thing to perform the operation based on the specific instruction if the comparison result has a normal value. After this, using the control instruction of the controller CT10 and a hash value (block hash) generated in a response processing, the first thing D1 generates a new n+1-th block and adds the n+1-th block to the n block chain having n blocks connecting thereto. Herein, the block hash includes an encrypted hash of the previous effective block (that is, the n-th block).

(4) In the Pool PL, a target value may be traced according to a predetermined difficulty level to find the block hash. If the block hash is found out, the discovery information of the block hash is spread to all of the nodes (specifically, herein, the cores C10, C20, C30 and C40 of the nodes). The Pool PL may be a specific group of nodes, or made up of constitutional elements of the managing server 800. In the case of the constitutional elements of the managing server, the managing server 800 may determine if the block hash is valid or not to spread the validity of the block hashes to each node, and in turn, each node approves the validity of the block hashes automatically.

(5) Each core C10, C20, C30 and C40 determines if the block hash has a correct value using the n-th block and sends confirming information.

(6) If the confirming information from the nodes reaches a predetermined time or number (for example, the number may corresponds to the number of approvals from five cores among all of the nodes included in the system), the control instruction and the response operation signal generated between the controller CT10 and the first thing D11 are recorded on the n+1-th block which is recorded on the n block chain.

(7) Dater Gathering Server (DGS) may be connected to each node through RPC to collect necessary information from each node. The DGS may be adapted to include constitutional elements in the form of an algorithmic program formed in each node, or correspond to a data collector located in the managing server 800.

Meanwhile, the authentication techniques of both the controllers and things are identical, and thus, only the control instruction of the controller may be used to apply the block chain authentication to the system. Further, although only the controller may be authenticated through the block chain authentication technique, there is no problem in the security of the system (because the things do not response to anything without a control instruction from the controller). Accordingly, it may be also preferable to authenticate only the controllers with the block authentication technique in light of reduction of processing load in the system.

In each thing, a public key and a corresponding private key may be periodically and automatically renewed, or intentionally renewed according to a user's necessity. Specifically, the memory storing public keys and private keys may include EEPROM, S-RAM and the like which are nonvolatile and capable of providing both of reading and writing functions. In a case where such a structure is used, it is preferable to add a renewal data to the block chain whenever the renewal process takes place, so as to further prevent any bad outsider from making possible hacking, manipulation, interruption or and the like. As such, the authentication technique by which public keys and private keys are periodically renewed to things and data of the renewed public keys and private keys are reflected on the block chain is one of novel features of the present invention over the authentication of the existing bitcoin block chain.

Meanwhile, n+1 block chain is approved to be valid from the nodes of the effective numbers among all of the nodes. Therefore, after this, in a case where the hash block representing n+2-th block is generated, the n+1 block chain is a reference for providing validity to the n+2-th block. In the process of FIG. 2, there is no any entity except for only the first controller and the first thing that sequentially generate the unique control instruction and the unique response signal. If a bad outsider tries to impair the validity of the first controller, it is required to decrypt and fake all of the past block hash encryptions, which is excessively time-consuming and totally impractical.

Hereinafter, structures and relationships among the cores C, the controllers CT, and the managing server 800 will be described.

Figure 3:
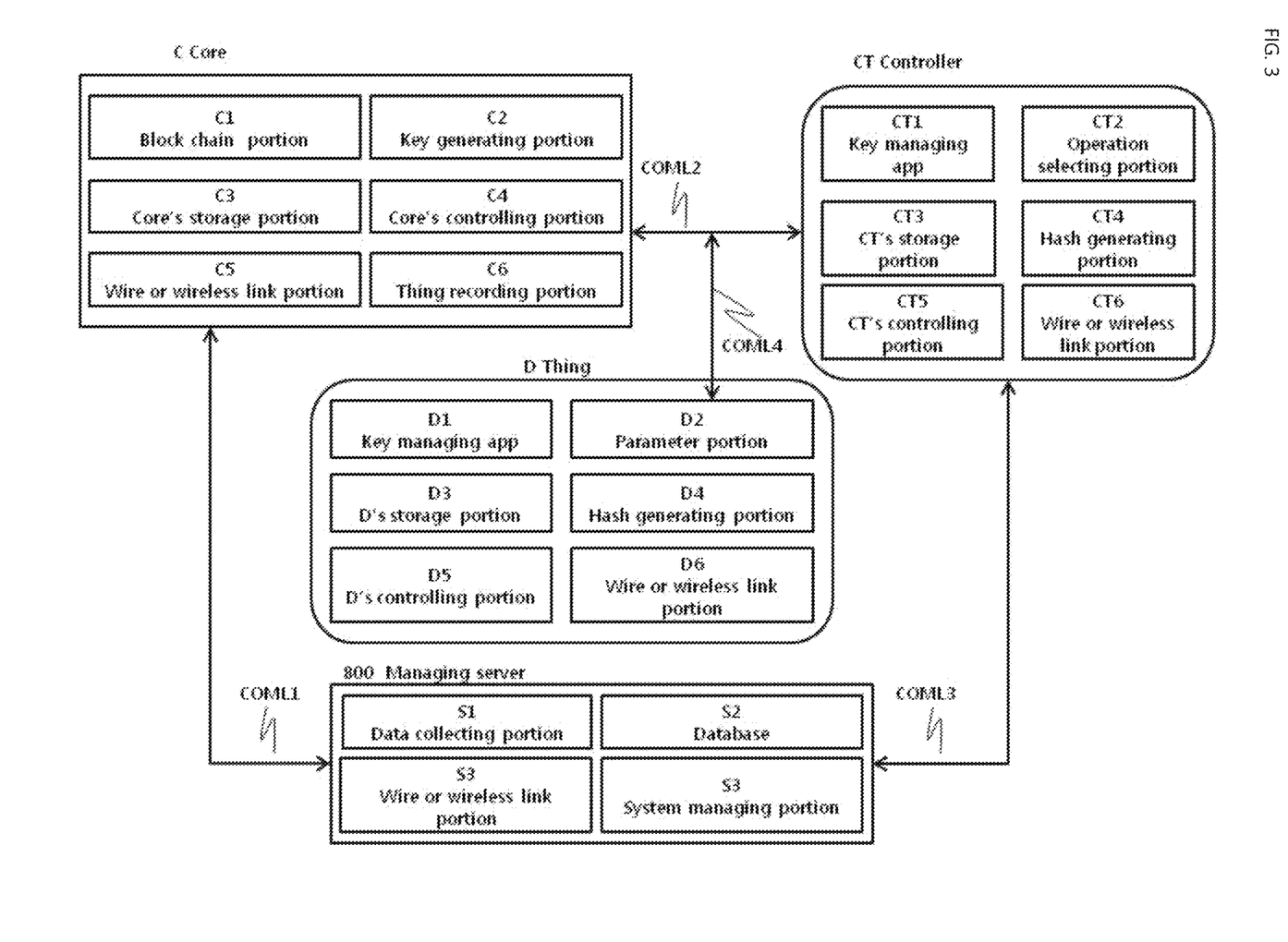
FIG. 3 is a schematic view showing structures and connection relations of a core, a controller and a managing server, which are involved in the block chain authentication according to an embodiment of the present invention.

FIG. 3 is a schematic view showing structures and connection relationships among a core, a controller and a managing server, which are involved in the block chain authentication, according to an embodiment of the present invention.

A core C is generally included in each node D and basically may includes a block chain portion C1 which commonly stores, manages and renews block chains representing operation histories of controllers CT and things D of the corresponding node, and other operation histories of controllers CT and things D of other nodes, a key generating portion C2 which generates public keys and private keys of the controller CT and the things D in the node ND, a core's storage portion C3 which has an operation memory and an operation program of the core C, a core's controlling portion C4 which determines if approving a block hash and controls each constitutional element, a wire or wireless link portion C5 which is used for a communication with other constitutional elements, and a thing recording portion C6 which records functional characteristics and control characteristics of things and controllers included in a unit node.

The controller may include a mobile terminal (for example, a smart phone and the like), a computer (for example, a personal computer and the like), a mobile or fixed controller of a wire or wireless type having a user interface, and the like. And thus, the controller has a CPU or an MPU, operates with an independent application program in itself to control the operations of things D, and is capable of communicating with other nodes through a core C in a wire or wireless mode. The controller may be located in a home and a building or an outside field in the influence area of a node in which communication between nodes is also available.

Similarly to a thing, the controller CT basically includes a key managing portion CT1 which has a list including the controller's own public key and private key and other things' private keys and public keys such that the controller CT may send a control instruction to a thing and the thing also may send a response thereto within the node. Further, the controller CT may have constitutional elements that include an operation selecting portion CT2 which can select one of operation kinds of things (and which may be an interface or app for letting a person select the kinds of operation) (The kinds of operation may include operation start, stop, operation time, strength (degree) of operation, an operation for providing data of current state information such as battery state, heat degree, operation speed and the like). The constitutional elements of the controller CT may further include a storage portion CT3 which stores an operational program of the controller CT and various kinds of data therein, a hash generating portion CT4 for making encryption, a CT's controller CT5 which controls each constitutional elements within the controller or has a function for analyzing and determining data of the storage portion CT3, and a wire or wireless link portion C6 which is used for a communication with other outside entities. The wire or wireless link portion CT6 may properly include an internet, a mobile communication network, an LPWAN and the like, according to hardware and application programs (app) of the controller.

A thing D is basically similar to a controller in function, but there may be a difference between the thing D and the controller in a parameter portion D2 of the thing D and the operation selecting portion CT2 of the controller CT. The parameter portion D2 may collect effective data of things from sensors or provide parameters for representing operation characteristics of things to controlling portions of things D or the controller CT so that the controlling portions or the controllers may analyze and determine the received data using the parameter materials.

Both of the controller CT and the thing D may be adapted to include, for example, an MPU, or an independent one-chip processor which includes a processor (CPU) and a memory, I/O, a wire or wireless communication portion and the like. However, the controller CT may be structured by a mobile terminal or a PC. In the case of the controller corresponding to a mobile terminal or a PC, the controller may be structured mainly by software functioning as a user interface in the form of an app program and a hardware resource itself of a mobile terminal or a PC.

The managing server 800 may include a data collecting portion S1 which collects various kinds of data generated in the thing management system, a database S2 which manages various kinds of data of the system, and a system managing portion S4 which performs updating, system operating, billing and the like. However, the major operations of the thing management system are automatically and independently performed in the system, and the data collecting portion may be adapted to include a distributed structure such that the constitutional elements of the data collecting portions are widely distributed in each node. Specifically, the managing server 800 of the present invention may not positively control all of the thing management system but may perform an auxiliary function for managing of a minimum required load essentially necessary in the system. More specifically, even without the managing server 800, the thing management system may be adapted to be operated in the main function by itself.

In FIG. 3, communication lines COML1, COML2, COML3 and COML4 may include any one of wire lines, wireless lines, short-range communication lines or long-range communication lines.

Next, the general operation of the system according to aspects of the present invention will be described with reference to FIG. 4.

Figure 4:
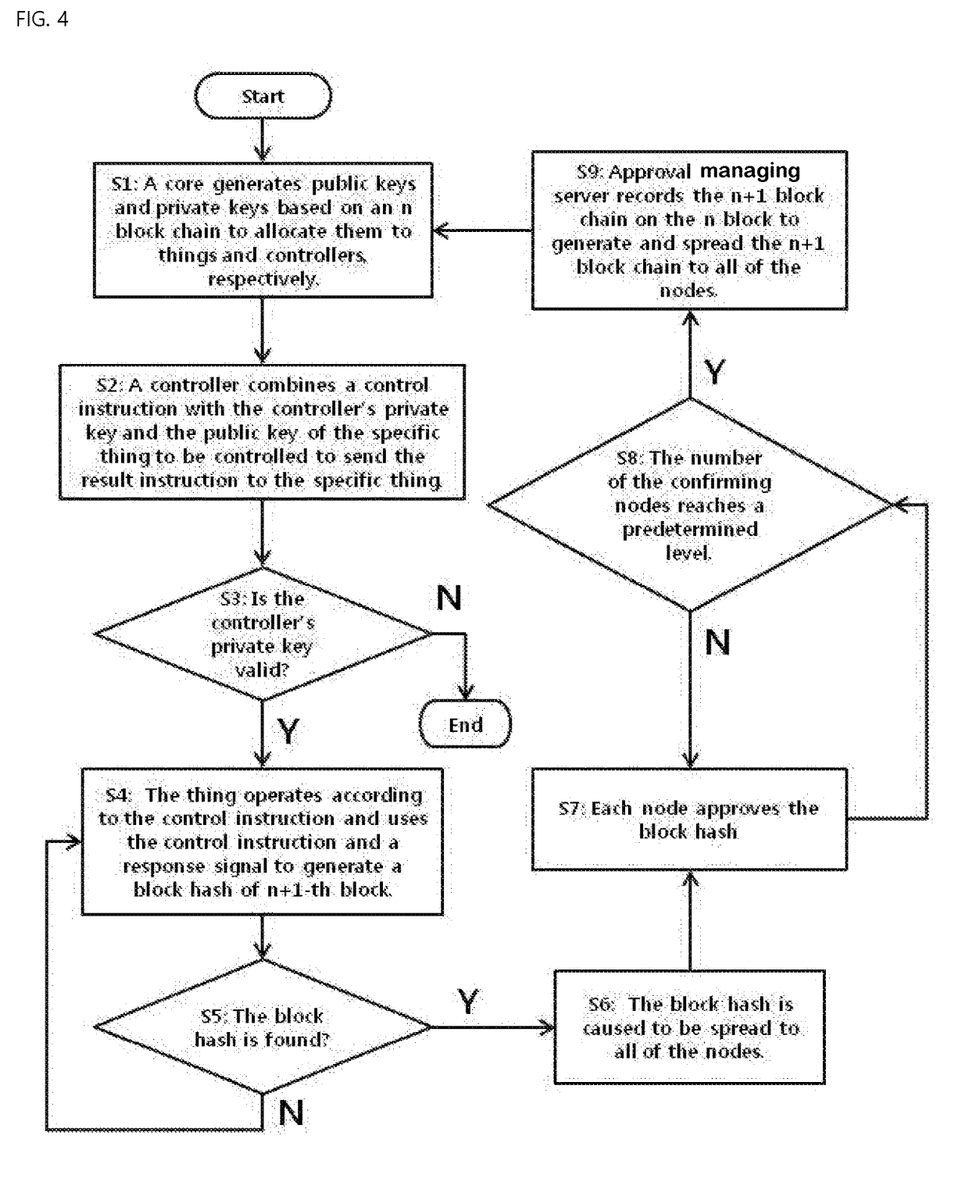
FIG. 4 a flow chart showing an IoT-based thing management method, according to an embodiment of the present invention.

FIG. 4 is a flow chart showing an IoT-based thing management method using IoT-based thing management system, according to an embodiment of the present invention. The first core C10, the first thing D11 and the first controller CT10 in FIG. 2 are mainly focused for a brief description.

Step S1: The core C10 generates pairs of public keys and private keys which are authenticated to each other based on the previous block chain. The core C10 allocates the generated public keys and private keys in pairs to each of things D11, D12 and D13 and the controller CT10. Herein, the terminology, "allocate" means implanting the keys into the storage portions of the things and the controller or renewing the existing keys in pairs so as to be changed into newly generated keys in the things and the controllers.

Step S2: The controller CT10 combines control instructions with the private key of the controller CT10 and the public key of the first thing D11 and provides the resultant control instructions to the first thing. In this case, the resultant control instruction includes an encrypted hash of the effective n-th block. The encrypted hash of the n-th block has the approved validity up to now and further verifies consistency of the controller CT10.

Step S3: The first thing D11 confirms if the received control instruction is valid or not using the private key of the first thing. If the validity of the control instruction is not confirmed, the first thing D11 stops the operation thereof.

Step S4: If the validity of control instruction is confirmed, the first thing D11 performs an operation according to the control instruction, and generates a response signal and a block hash of both the response signal and the control instruction corresponding to an n+1-th block. In this case, the controller may generate the block hash instead of the first thing. Generally, in a case where the controller generates the block hash, the case is of further advantageous to Low Power Wide Area Network (LPWAN). Specifically, thing devices using the LPWAN may be widely used as sensor devices for data collection because the LPWAN can provide further longer and further stronger communication ability with relatively low power consumption. However, in a case where things are used as a sensor for data collection and located for a long time in a remote field and mountain where a person has a difficulty in physically accessing thereto, batteries for sensors of things may be essentially used because there is difficulty in supplying electric power to the sensors or things. For this reason, it is required that a thing device should consume a lower power energy from a battery for a long term life such as one to five years. As such, because a thing device is required to be a low power consumption type in the system, it is important that, if possible, a required load for operational processing in a system can be shifted from thing devices to other devices to which electric power can be more easily supplied. In this point of view, the controller CT10 may be further preferable to the first thing D11 in generating the block hash.

Step S5: The controller CT10 or the first thing D11 finds the block hash in the pool PL in Step S4.

Step S6: The block hash may be spread to other nodes in the pool PL, or the controller CT10 may cause the core C10 to spread the block hash to the other nodes. Alternatively, the data collecting portion S1 of the managing server 800 may collect the block hash and then spread the collected block hash to all of the nodes or the pool PL. If the block hash is spread, a specific node among a group of nodes may decrypt the block hash and approve the block hash as the n+1-th block to spread the new approved n+1-th block to all of the nodes.

Steps 7, 8 and 9: If each node approves the block hash as the n+1-th block (57), and confirming nodes reach a predetermined number (S8), the managing server 800 adds and records the n+1-th block to the n block chain, and thus, the n+1 block chain is generated and spread to all of the nodes to finally finish the process for generating the n+1 block chain. After then, a new processing starts from Step S1, public keys and private keys are newly generated on the basis on the n+1 block chain.

Although the preferable embodiments of the invention have been described, the scope of the invention is not limited thereto. For example, in Step S9, instead of the managing server 800, a specific node (a node which firstly decrypts an arithmetic code) may generate and record the n+1 block chain to be spread. This case is more preferable, particularly, because the management operation of the managing server 800 can be removed in this process. Further, the present invention may be applied to not only homes, buildings, research centers, farms, factories and military fields, but also, a system for monitoring the disadvantaged such as a senior citizen who lives alone, a recipient of a livelihood program who lives alone, or anyone who needs caring or monitoring of daily life and preventing solitary deaths of them. The system for the disadvantaged may be provided in homes, reception centers and the like which may include electrical power supplying equipments, piped water supplying facilities, gas supplying facilities, home appliances such as TVs, refrigerators and the like, and basic life pipeline measurement equipments, from which data may be monitored and collected by officers in charge of a public institution or a health center or a medical institution. In this case, the present invention can provide a solution for fundamentally preventing any bad communication intruder from intervening or intruding into the system during processing of the monitoring and collecting.

[Reference numerals of Elements in the drawings]

100, 200: WiFi/Bluetooth network
300, 400: Gateway GW
500: Low Power Wide Area Network (LPWAN)
600: Internet                    700: Mobile network
800: Managing server
BL1, BL2, BL3 and BL4: Approval confirmation line
C1: Block chain portion          C2: Key generating portion
C3: Core's storage portion
C4: Core's controlling portion
C5: Wire or wireless link portion
C6: Thing recording portion      C10-C40: Cores
COML1, COML2, COML3 and COML4: Communication lines
CT1: Key managing portion
CT2: Operation selecting portion
CT3: Storage portion
CT4: Hash generating portion
CT5: CT's controlling portion
CT6: Wire or wireless link portion
CT10-CT40: Controllers           D1: Key managing portion
D2: Parameter portion            D3: Storage portion
D4: Hash generating portion
D5: CT's controlling portion
D6: Wire or wireless link portion
D11-D43: Things                  DGS: Data gathering server
MT: Mobile terminal              S1: Data collecting portion
S2: Database                     S3: Wire or wireless link portion
S4: System managing portion

What is claimed:

1. An Internet of Things (IoT)-based thing management system using block chain authentication wherein unit nodes connect to each other through at least one of a wire communication network or a wireless communication network, things connect to each other in each of the unit nodes, and control instructions for causing the things to be operated are mutually authenticated by the unit nodes so as to confirm the validity of the control instructions, wherein each of the unit nodes comprises:

a plurality of things that connect directly or indirectly to at least one of the wire communication network or the wireless communication network, each of the plurality of things performing individual functions separately; and a core that includes an n block chain having n blocks, wherein n is a natural number, the n block chain recording operation histories of the plurality of things, the n blocks linked one after another in the form of a chain, and the core configured to generate unique public keys and unique private keys based on the n block chain and to provide the generated unique public keys and unique private keys to each of the plurality of things, wherein one of the plurality of the things includes a controller that has a list of public keys provided by the core, each of the public keys unique to each of the plurality of things, the controller configured to:

send a resultant control instruction by combining a control instruction with a private key of the controller and a public key of the specific thing of the plurality of things for which the public key is selected by the controller from the list of the public keys, to control operations of the specific thing based on the sent control instruction, the resultant control instruction including an encrypted hash of an effective n-th block that was previously approved and confirmed by the plurality of unit nodes, and in response to the specific thing determining that the control instruction is valid based on the private key, receive a resultant response signal that includes a response signal from the specific thing combined with a private key of the specific thing, the resultant response signal sent from the specific thing in response to the control instruction and performance of an operation according to the control instruction by the specific thing, wherein:

the resultant response signal includes an n+1-th block, or the controller computes the n+1-th block based on the resultant response signal, and wherein when the n+1-th block includes an n+1-th block hash including an encrypted hash of an effective n-th block that was previously approved and confirmed by a predetermined number of the plurality of unit nodes required to confirm the n+1-th block for generating the public keys and the private keys wherein at least a part of the unit nodes send, to other unit nodes, an approval confirmation signal for approving the n+1-th block corresponding to the n+1-th block hash, and the approval confirmation signal is generated by each unit node on the basis of the n block chain that each unit node has, and wherein, in the things, the public keys and the private keys are automatically and periodically renewed by adding a renewal data to the n block chain.

2. The system according to claim 1, wherein the controller includes a mobile terminal, a computer, or an independent module having a microprocessor, a memory and a control program installed therein; and wherein the core is disposed in a unit node, or disposed in a controller, a mobile terminal, or a computer such that the core can be connected to other cores through the wire communication network or the wireless communication networks by using a part of resources of the controller, the mobile terminal or the computer.

3. The system according to claim 1, wherein when the number of the approval confirmation signals provided the unit nodes reaches a predetermined times, the n+1-th block corresponding to the block hash is linked and recorded to the n block chain to resultantly generate an n+1 block chain such that the generated n+1 block chain is spread to all of the unit nodes and the n block chain is renewed to be changed into the n+1 block chain.

4. The system according to claim 3, wherein at least one of the control instructions or the response signals includes an issuing time, and the generation of the block hash is performed by a controller or a thing.

5. The system according to claim 1, wherein the wire communication network includes internets and the wireless communication network includes at least one of mobile networks and Low Power Wide Area Network (LPWAN).

6. The system according to claim 1, wherein the unit node includes a thing system in a home or a reception center, and the system is configured to figure out states of at least one of an elderly, infirm, or handicapped person on the basis of operation history patterns of each thing in the home or the reception center.

7. The system according to claim 1, wherein the unit node includes a system in at least one of homes, buildings, farms, factories, distribution fields, roads, a field, or a mountain, and at least one of the unit nodes includes a drone, a car or a smart palm as a thing.

8. An Internet of Things (IoT)-based thing management method using an IoT-based thing management system using block chain authentication wherein unit nodes connect to each other through at least one of wire communication network or wireless communication network, things connect to each other in each of the unit nodes, and control instructions for causing the things to operate are mutually authenticated by the unit nodes so as to confirm the validity of the control instructions, wherein the IoT-based thing management system comprises: a plurality of things which connect directly or indirectly to at least one of the wire communication network or the wireless communication network, each of the plurality of things performing individual functions separately, a core which includes an n block chain having n blocks, wherein n is a natural number, the n block chain recording operation histories of the plurality of things, the blocks being linked one after another in the form of a chain, and the core generating unique public keys and unique private keys based on the n block chain and providing the generated keys to each of the things, and a controller which controls operations of the plurality of the things, the method comprising:

generating, by the core, unique public keys and corresponding private keys based on an n block chain;

allocating the generated keys to the plurality of things and the controller individually;

providing a list of the public keys and corresponding private keys to the plurality of things and the controller;

combining, by the controller, a control instruction with a private key of the controller and a public key of a first thing as a control target to produce a resultant control instruction, the resultant control instruction including an encrypted hash of an effective n-th block that was previously approved and confirmed by the plurality of unit nodes;

providing the resultant control instruction to the first thing;

confirming, by the first thing, validity of the control instruction using the private key of the first thing; and in response to the specific thing determining that the control instruction is valid based on the private key, sending the controller a resultant response signal that includes a response signal from the first thing combined with the private key of the first thing, the resultant response signal sent from the first thing in response to the control instruction and performance of an operation according to the control instruction by the first thing, wherein:

the resultant response signal includes an n+1-th block, or the controller computes the n+1-th block based on the resultant response signal, and wherein when the n+1-th block includes an n+1-th block hash including an encrypted hash of an effective n-th block that was previously approved and confirmed by a predetermined number of the plurality of unit nodes required to confirm the n+1-th block for generating the public keys and the private keys, wherein at least a part of the unit nodes send, to other unit nodes, an approval confirmation signal for approving the n+1-th block corresponding to the n+1-th block hash, and the approval confirmation signal is generated by each unit node on the basis of the n block chain that each unit node has, and wherein, in the things, the public keys and the private keys are automatically and periodically renewed by adding a renewal data to the n block chain.

9. The method according to claim 8, wherein the controller includes a mobile terminal, a computer, or an independent module having a microprocessor, a memory and a control program installed therein; and wherein the core is disposed in a unit node, or disposed in a controller, a mobile terminal, or a computer such that the core can be connected to other cores through the wire communication network or the wireless communication network by using a part of resources of the controller, the mobile terminal or the computer.

10. The method according to claim 9, wherein at least one of the control signals and the response signals includes an issuing time, and the generation of the block hash is performed by a controller or a thing.

11. The method according to claim 8, wherein the wire communication network includes internets and the wireless communication network includes at least one of mobile networks and Low Power Wide Area Network (LPWAN).

12. The method according to claim 8, wherein the unit node includes a system in a home or a reception center, and the system is configured to figure out states of at least one of an elderly, infirm, or handicapped person on the basis of operation history patterns of each thing in the home or the reception center.

13. The method according to claim 8, wherein the unit node includes a system in at least one of homes, buildings, farms, factories, distribution fields, roads, fields, or mountains, and at least one of the unit nodes includes a drone, a car or a smart palm as a thing.

* * * * *